US008909932B2

(12) United States Patent
Buer et al.

(10) Patent No.: US 8,909,932 B2
(45) Date of Patent: *Dec. 9, 2014

(54) METHOD AND APPARATUS FOR SECURITY OVER MULTIPLE INTERFACES

(75) Inventors: Mark L. Buer, Payson, AZ (US);
Edward H. Frank, Atherton, CA (US)

(73) Assignee: Broadcom Corporation, Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/620,375

(22) Filed: Sep. 14, 2012

(65) Prior Publication Data

US 2013/0077782 A1    Mar. 28, 2013

Related U.S. Application Data

(63) Continuation of application No. 11/234,025, filed on Sep. 22, 2005, now Pat. No. 8,281,132.

(60) Provisional application No. 60/631,484, filed on Nov. 29, 2004.

(51) Int. Cl.
| | | |
|---|---|---|
| H04L 9/32 | (2006.01) | |
| H04L 9/08 | (2006.01) | |
| G06F 21/72 | (2013.01) | |
| G06F 11/30 | (2006.01) | |
| G06F 11/00 | (2006.01) | |

(52) U.S. Cl.
CPC ...... *H04L 9/0861* (2013.01); *G06F 2221/2129* (2013.01); *H04L 9/3297* (2013.01); *H04L 9/0841* (2013.01); *H04L 2209/56* (2013.01); *G06F 21/72* (2013.01); *H04L 9/0877* (2013.01)

USPC ............... 713/171; 713/189; 726/2; 726/22; 726/23; 726/24; 726/25; 380/44

(58) Field of Classification Search
CPC ............ G06F 21/72; G06F 2221/2129; H04L 9/0877
See application file for complete search history.

(56) References Cited

U.S. PATENT DOCUMENTS

| | | | | | |
|---|---|---|---|---|---|
| 4,658,093 | A | * | 4/1987 | Hellman | 705/52 |
| 4,807,288 | A | * | 2/1989 | Ugon et al. | 380/30 |
| 5,227,613 | A | | 7/1993 | Takagi et al. | |
| 5,568,552 | A | * | 10/1996 | Davis | 705/59 |
| 5,796,840 | A | | 8/1998 | Davis | |

(Continued)

FOREIGN PATENT DOCUMENTS

WO    WO 02/078341 A2    10/2002

OTHER PUBLICATIONS

European Search Report issued Mar. 30, 2006 for Appl. No. EP 05024455, (3) pages.

*Primary Examiner* — Dede Zecher
*Assistant Examiner* — Trang Doan
(74) *Attorney, Agent, or Firm* — Sterne, Kessler, Goldstein & Fox P.L.L.C.

(57) ABSTRACT

A secure digital system including a number of ICs that exchange data among each other. Each of the ICs includes a key generator for generating a cipher key; a memory for securely storing the generated cipher key; an authenticating module for authenticating neighboring ICs of a respective IC; an encryption module for encrypting data communicated from the respective IC to the neighboring ICs; and a decryption module for decrypting data received from the neighboring ICs.

19 Claims, 7 Drawing Sheets

(56) References Cited

U.S. PATENT DOCUMENTS

| | | |
|---|---|---|
| 6,209,098 B1 | 3/2001 | Davis |
| 6,298,135 B1 | 10/2001 | Messerges et al. |
| 6,401,208 B2 | 6/2002 | Davis et al. |
| 6,836,847 B1 | 12/2004 | Zinger et al. |
| 7,100,048 B1 | 8/2006 | Czajkowski et al. |
| 7,216,232 B1 | 5/2007 | Cox et al. |
| 7,302,572 B2 | 11/2007 | Shinriki et al. |
| 7,346,718 B2 | 3/2008 | Sakamura et al. |
| 7,466,821 B2 | 12/2008 | Rhelimi et al. |
| 2002/0080974 A1 | 6/2002 | Grawrock |
| 2002/0104872 A1* | 8/2002 | DeFelice et al. ............... 228/103 |
| 2004/0030896 A1* | 2/2004 | Sakamura et al. ............. 713/169 |
| 2004/0034766 A1 | 2/2004 | Sakamura et al. |
| 2004/0044902 A1* | 3/2004 | Luthi ............................ 713/200 |
| 2004/0078584 A1 | 4/2004 | Moroney et al. |
| 2004/0136529 A1 | 7/2004 | Rhelimi et al. |
| 2004/0247118 A1 | 12/2004 | Tateno et al. |
| 2005/0151777 A1* | 7/2005 | Silverbrook .................... 347/19 |
| 2005/0157872 A1 | 7/2005 | Ono et al. |
| 2006/0115081 A1 | 6/2006 | Buer et al. |

\* cited by examiner

METHOD AND APPARATUS FOR SECURITY OVER MULTIPLE INTERFACES

CROSS-REFERENCE TO RELATED APPLICATIONS

This patent application is, a continuation of U.S. application Ser. No. 11/234,025, filed Sep. 22, 2005, issuing as U.S. Pat. No. 8,281,132 on Oct. 2, 2012, which claims the benefit of the filing date of U.S. Provisional Patent Applications Ser. No. 60/631,484, filed Nov. 29, 2004 and entitled "METHOD AND APPARATUS FOR SECURITY OVER MULTIPLE INTERFACES"; both of which are hereby expressly incorporated by reference.

FIELD OF THE INVENTION

This application relates to secure digital systems/devices and more specifically, to an integrated circuit chip secured at the hardware level.

BACKGROUND OF THE INVENTION

The proliferation of distributed computing networks has brought with it a greater need to secure the information that is transmitted through the networks. Moreover, with higher integration of electronic circuits on smaller Integrated Circuits (ICs), electronic components are increasingly capable of processing more complex data and performing more functions. ICs within the same digital system, for example, a Personal Computer (PC), a set-top box, or a mobile phone are communicating more security sensitive data to/from other ICs within the same system. Furthermore, these ICs are increasingly being used to store, process, and communicate sensitive data. Therefore, the data stored and communicated by these ICs need to be secured.

A variety of cryptographic techniques are known for securing transactions in data networks. For example, the Secure Socket layer (SSL) protocol and its successor Transport Layer Security (TLS) provides a mechanism for securely sending data between a server and a client. Briefly, the SSL provides a protocol for authenticating the identity of the server and the client and for generating an asymmetric (private-public) key pair. The authentication process provides the client and the server with some level of assurance that they are communicating with the entity with which they intended to communicate. The key generation process securely provides the client and the server with unique cryptographic keys that enable each of them, but not others, to encrypt or decrypt data they send to each other via the network. SSL involves a number of basic phases: Peer negotiation for algorithm support, Public-key encryption-based key exchange and certificate-based authentication, and Symmetric cipher-based traffic encryption.

FIG. 1 shows, in simplified form, several layers in a security system 102. Entities in the system may securely transfer data between one another by encrypting the data 104 before it is transmitted. Before another entity is able to decrypt received data, however, it must obtain an appropriate key. Hence, data encryption depends on a secure method of key negotiation 106 between the entities. If the key negotiation is not secure (e.g., the keys are subject to interception by unauthorized persons), the encrypted data may be compromised. Likewise, a prerequisite to secure key negotiation is the ability to authenticate the parties 108 involved in the exchange. In other words, each entity must be sure that it is not negotiating with an entity that is, for example, masquerading as the intended entity (middle man attack). The authentication process ultimately relies on a root key 110 that uniquely and reliably identifies a specific entity. Hence, this root key is often referred tows the cryptographic identity of the entity.

In practice, a root key is used to generate other keys that may then be used to generate even lower level keys. Typically, these lower level keys will be used for relatively short periods of time. For example, lower level keys such as SSL session keys may be valid only for a single session. Thus, the potential for damage may be much less in the event a session key is compromised as opposed to a higher level key. For example, in the case of a security breach, the entire system will not be compromised and the key will expire relatively quickly.

In contrast, once a higher level key is compromised, all subsequent (e.g., lower) levels may be compromised. Moreover, higher level keys tend to be used for relatively long periods of time. Thus, the potential for harm is much greater. Accordingly, protection of higher level keys is a primary goal in any cryptographic security system.

For example, in a typical e-commerce transaction a unique set of SSL keys are generated for each session. For instance, when a user uses a web browser to securely access a financial website for a bank, a set of session keys may be generated for the session. These session keys are used to encrypt and decrypt data sent between the server (e.g., the bank's server) and the client (e.g., the browser). To prevent these keys from being intercepted by unauthorized persons, a higher level key (e.g., a private-public key pair negotiated between the bank's server and the client) will be used to encrypt and decrypt the session level keys. As discussed above, however, protection of this higher level key is of utmost importance.

Referring to FIG. 2, in a typical PC-based application, a client device stores its private key (Ka-priv) 214 in a system memory 206 of the computer 200. When a session is initiated, the server encrypts the session key (Ks) 228 using the client's public key (Ka-pub) then sends the encrypted session key (Ks)Ka-pub 222 to the client. As represented by lines 216 and 224, the client then retrieves its private key (Ka-priv) and the encrypted session key 222 from system memory via the PCI bus 208 and loads them into a public key accelerator 210 in an accelerator module or card 202. As represented by line 226, the public key accelerator uses this downloaded private key 220 to decrypt the session key and loads the clear text session key (Ks) 228 into system memory.

When the server needs to send sensitive data to the client during the session the server encrypts the data using the session key (Ks) and loads the encrypted data (data) Ks 204 into system memory. When a client application needs to access the plaintext (unencrypted) data, it may load the session key 228 and the encrypted data 204 into a symmetric algorithm engine (e.g., 3DES, AES, etc.) 212 as represented by lines 230 and 234, respectively. The symmetric algorithm engine uses the loaded session key 232 to decrypt the encrypted data and, as represented by line 236, loads plaintext data 238 into system memory. At this point the client application may use the data.

The SSL protocol and other protocols provide a relatively high level of security for data transfers over a computer network, when both the client and the server are secure. However, given the increased sophistication of hackers and authors of computer viruses, there is a possibility that the security of these devices may be comprised. For example, a virus running on a computer may be able to access data stored in the data memory of the computer. Moreover, the virus may be able to send this information to a third party.

Referring again to the example of FIG. 2, the client's private key (Ka-priv) may be stored in the clear (e.g., unencrypted) in system memory and it may be transmitted in the clear across the PCI bus. Moreover, operating system calls may be used to provide the data transfers to and from the cryptographic accelerator. All of these aspects of the system are susceptible to attacks by hackers, viruses or other means. Given that in an SSL transaction the client's private key is essentially a certificate that identifies the server (hence it may essentially comprise the server's private key), conventional architectures such as this may not provide sufficient security for many applications.

Components such as a hardware security module ("HSM"), typically constructed as multi-chip boards, may be used to provide a higher level of security for highly security-sensitive applications. Conventionally, a hardware security module provides secure key management to generate cryptographic keys, sets the capabilities and security limits of keys, implements key backup and recovery, prepares keys for storage and performs key revocation and destruction.

However, these hardware modules or devices are not per se authenticated. It is typically the application that runs on these devices that is authenticated for ensuring data security among different applications that exchange data. Moreover, even the most sophisticated data security schemes are prone to security breaches at the component level. For example, a system may be probed at the component level (that is at the printed circuit board "PCB" level) to sniff a root (private) key. Once the private key is stolen, access to encrypted information becomes substantially easier. In some systems, the components are physically contained and made inaccessible, for example, by covering them with a thick layer of plastic type material. This approach may prevent unauthorized access to the components by probing the component pins or printed wires, for example, using a logic analyzer. However, this approach makes testing, debugging and repairing of the PCBs unreasonably difficult.

Accordingly, there is need for improved security in a digital system/device at the electronic component level that does not require any outside or remote server/entity to secure data communication in the digital system/device.

SUMMARY OF THE INVENTION

The invention relates to a method and system for authentication

In one embodiment, the invention is a secure digital system including a number of ICs that exchange data among each other. Each of the ICs includes a key generator for generating a cipher key; a memory for securely storing the generated cipher key; an authenticating module for authenticating neighboring ICs of a respective IC; an encryption module for encrypting data communicated from the respective IC to the neighboring ICs; and a decryption module for decrypting data received from the neighboring ICs.

In one embodiment, the invention is a secure IC including a plurality of input interfaces for receiving data from other ICs; a plurality of output interfaces for communicating data to the other ICs; an encryption module for encrypting the data communicated to the other ICs; and a decryption module for decrypting the data received from the other ICs.

In one embodiment, the invention is a method for securely processing data in a digital system including a plurality of ICs. The method includes: generating a unique cipher key for each of the plurality of ICs; securely storing each of the generated cipher keys in each respective ICs; authenticating neighboring ICs of a respective IC; and encrypting data communicated from the respective IC to the neighboring ICs.

In one embodiment, the cipher key is a public/private key pair and the memory is a one-time programmable memory that stores the private key. In one embodiment a data transaction history between two ICs is kept and each data transaction may be time stamped. The time stamped data transaction histories between respective ICs may be stored in a battery back up memory in a respective IC.

In one embodiment, a unique chip identification number is assigned to each IC and the public key is encrypted using the unique chip identification number. The chip identification number may be permanently assigned to an IC at time of manufacture. Also, the chip identification number may be encrypted.

BRIEF DESCRIPTION OF THE DRAWINGS

These and other features, aspects and advantages of the present invention will be more fully understood when considered with respect to the accompanying drawings, wherein.

DETAILED DESCRIPTION

In one embodiment, the invention relates to a method and system for authenticating neighboring data processing ICs in a digital system/device and encrypting data communicated between the neighboring data processing ICs. The authentication and encryption are performed in each data processing IC. Each data processing IC authenticates its neighbor data processing IC and then encrypts data that is communicated between the two ICs. This way, the authentication and data encryption between the data processing ICs is performed in hardware at the physical layer. This approach also ensures that a software application runs on a trusted hardware without having to require another application to ensure its security boundary.

Figure 1:
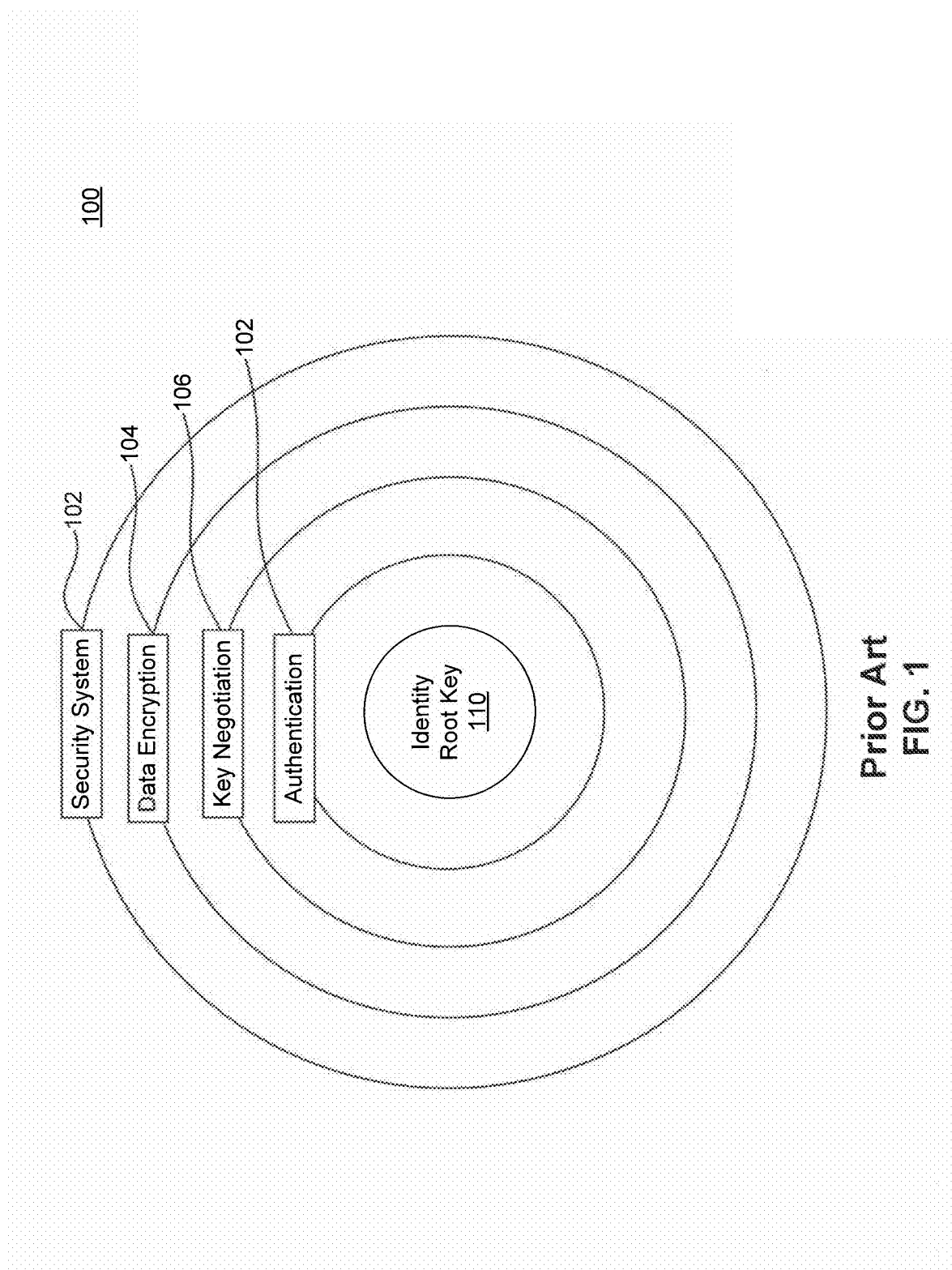
FIG. 1 is a simplified diagram of exemplary layers in a security system.
Figure 2:
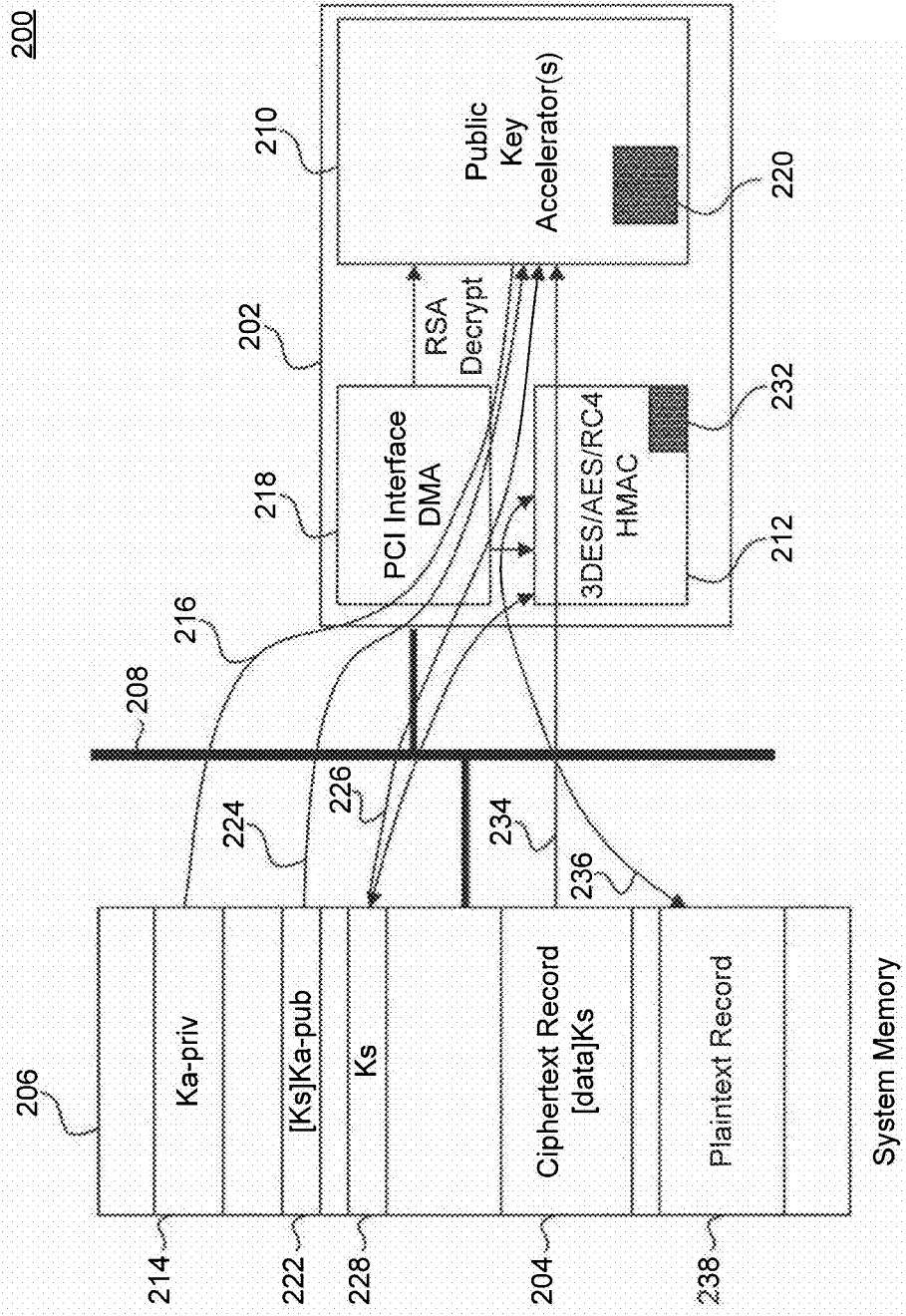
FIG. 2 is a simplified diagram of security processing in a computing system.
Figure 3:
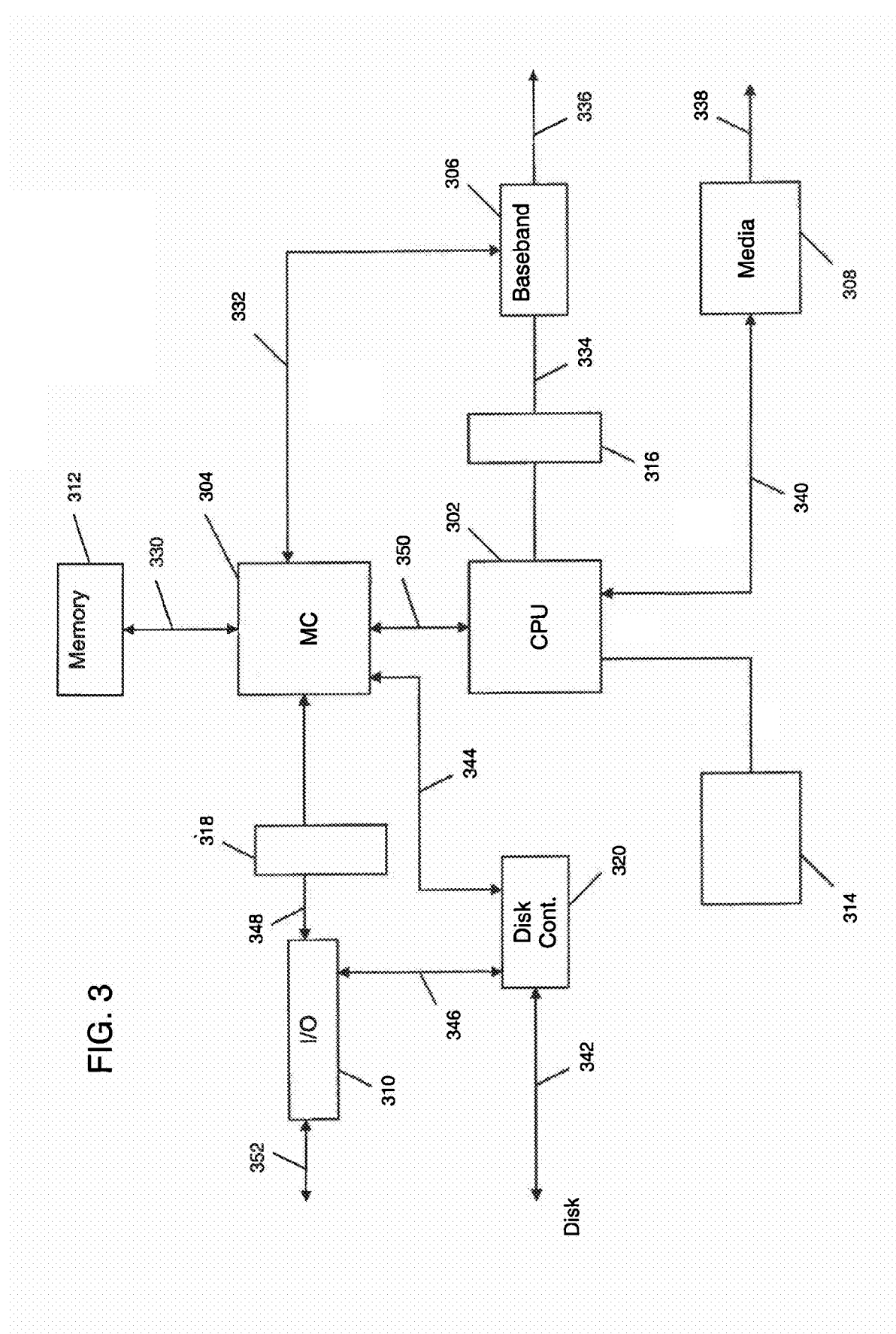
FIG. 3 is an exemplary block diagram of a digital system/device, according to one embodiment of the present invention.

FIG. 3 is an exemplary block diagram of a typical digital system/device. The digital system/device may be a PC, a set-top box, a mobile phone, and the like. The data processing ICs may be located in one or more PCBs, and/or multi-chip modules. At power up, each data processing IC, for example CPU 302, authenticates its neighbor data processing ICs, for example, Memory Controller 304, Baseband controller 306, and Media Processor 308. Memory Controller 304, in turn authenticates its neighboring data processing ICs, such as I/O controller 310 and Memory 312. In one embodiment, the Disk Controller 320 encrypts the commands that are being written to the hard disk. Note that the data to be written to the hard disk is already encrypted by the CPU 302. The non-data processing ICs, such as, the "glue logic" ICs 314, 316, and 318 need not be authenticated, because they do not perform any data processing function and thus do not transform the data, also, the data into and out of them is encrypted by the data processing ICs.

Each data processing IC includes a security module (described below) for generating a cipher key, for example, a public/private key pair that is unique to a particular data processing IC. The private key is then kept in the respective IC, as a permanent secret information, while the public key is communicated to (negotiated with) its neighbor data processing ICs. The public key may be communicated in an unencrypted form (plaintext) or in an encrypted form using a unique chip ID. Each data processing IC then uses its public/private key pair to authenticate its neighboring data processing ICs and then to encrypt/decrypt data output to/input from the other data processing ICs. This way, security is built into the silicon-based hardware, that is ICs. Furthermore, all the data communicated between (the already authenticated) data processing ICs is encrypted. For example, all data/command paths 330 to 352, depicted in FIG. 3, are secured by containing encrypted data.

Figure 4:
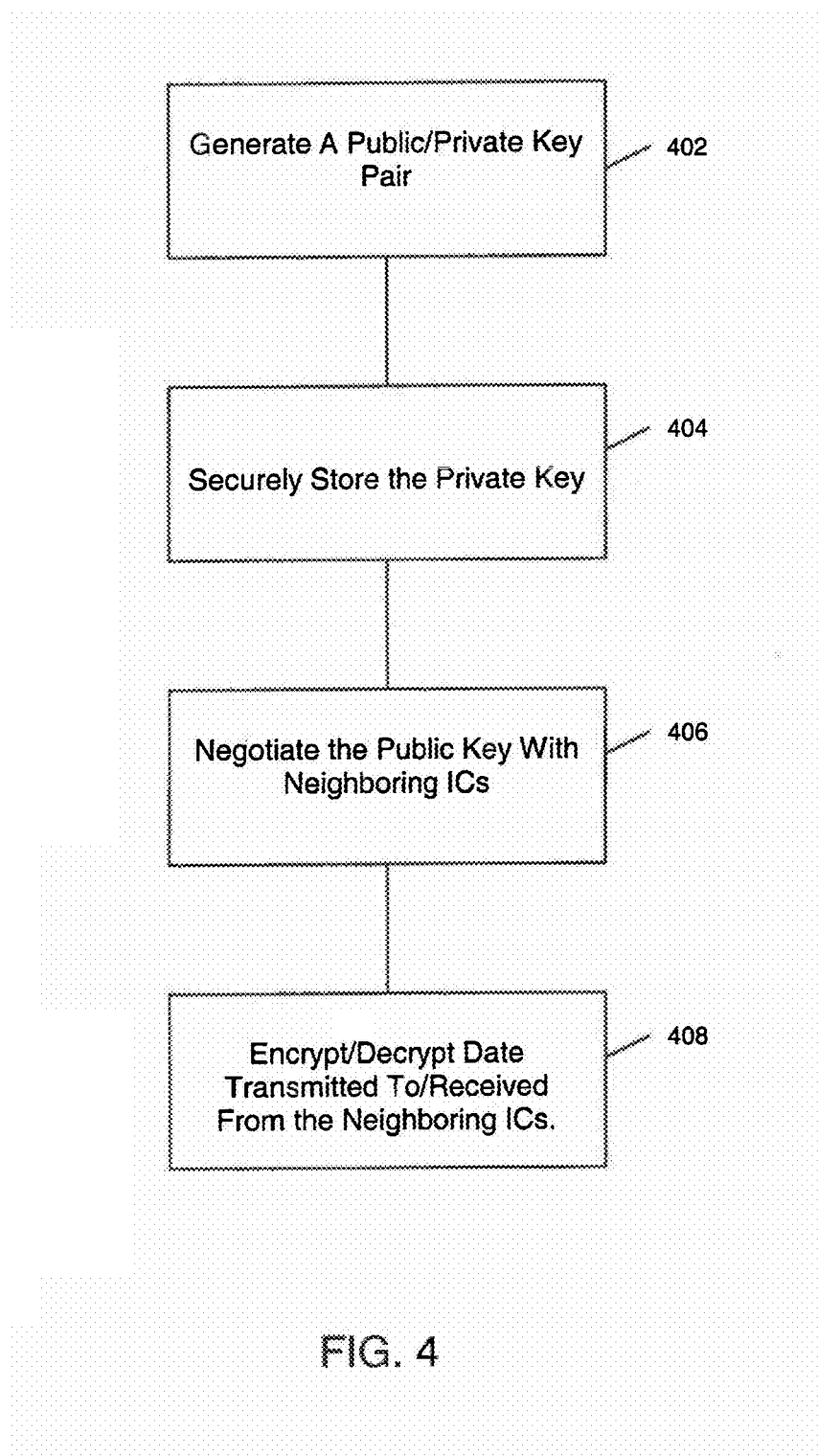
FIG. 4 is an exemplary process flow for securely processing data in a digital system/device, according to one embodiment of the present invention.

FIG. 4 illustrates an exemplary process flow for data security at a component level in a digital system, according to one embodiment of the present invention. As shown in block 402, each data processing IC, for example Media Processor 308 of FIG. 3, generates a public/private key pair, at power up. This may be accomplished by using a random number generator. Next, the generated private key is permanently stored in a secure manner in the Media Processor 308, as shown in block 404. In one embodiment, the private key is stored in a one-time programmable memory. The memory is then becomes read-only memory to securely store the private key. In block 406, the public key is then negotiated with a neighbor IC, along with a chip ID to authenticate the neighbor IC. The chip ID may be burned into the ICs at the manufacturing time. In one embodiment, the chip ID is encrypted. In one embodiment, each data processing IC keeps a table of all valid chip IDs.

In one embodiment, each data processing IC includes a time stamp circuitry for "time stamping" each transaction with each of its neighbor data processing IC. Furthermore, each neighboring data processing IC pair keeps a history of the transactions with each other. This transaction history, along with the time stamp, is incorporated with each data transaction across the neighboring ICs. As a result, the system is protected from security breaches, such as, replay attacks.

In one embodiment, the transaction history is generated by using a transaction counter and is stored in a battery back up memory (e.g., NVM). Therefore, each data processing IC has a shared state with each of its neighbor data processing ICs. The shared state includes, for example, how many times the two ICs have interacted with each other at a given time. Because only the respective two neighboring ICs know their shared state, a potential attacker is prevented from mimicking or replaying the transactions between the two ICs.

Referring back to FIG. 4, once the neighbor data processing IC is authenticated, the public/private key is used to encrypt any data communicated between the two chips, as depicted in block 408. From now on, all the transactions between the two ICs are within a secure encrypted boundary, at the hardware level.

Figure 5:
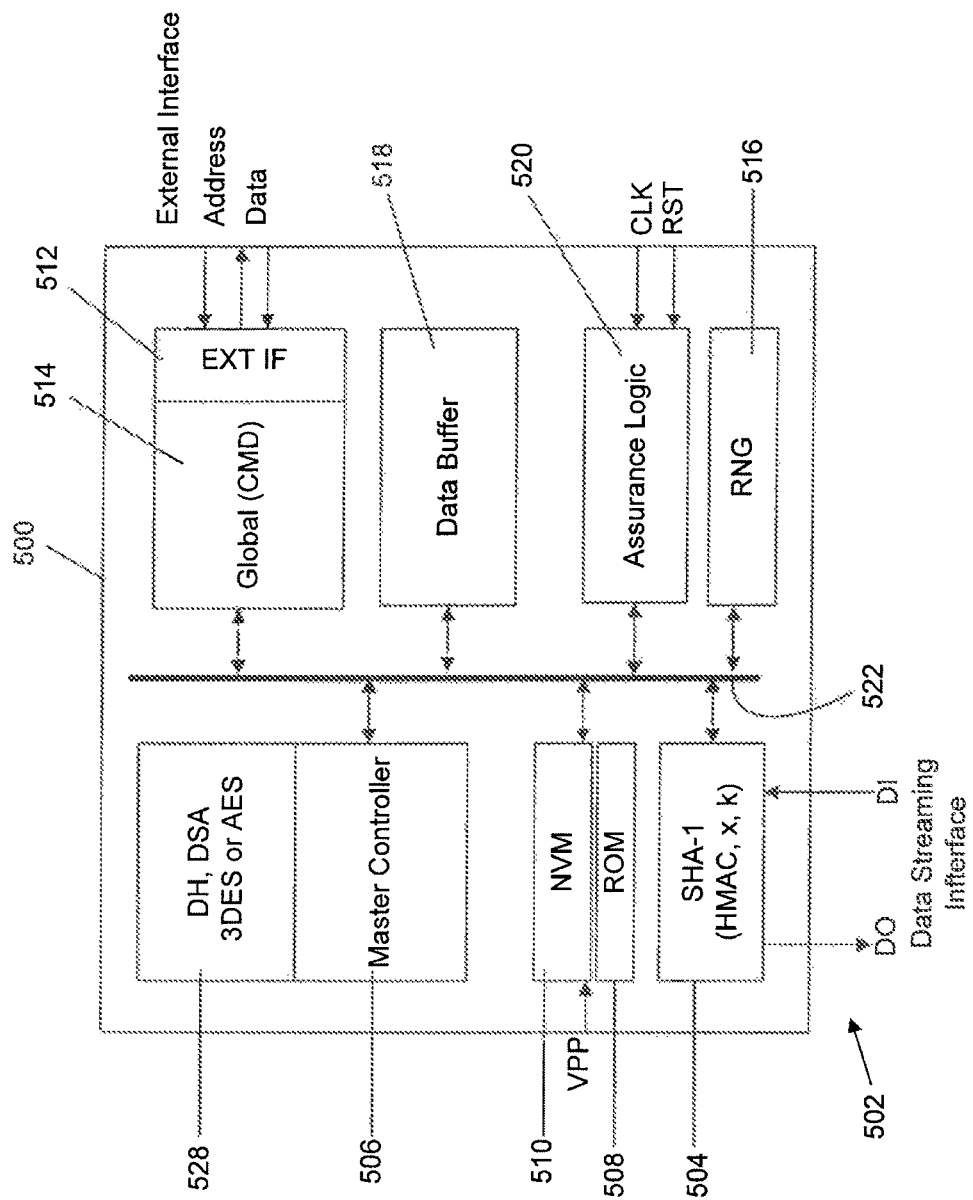
FIG. 5 is a simplified block diagram of a hardware security module, according to one embodiment of the present invention.

FIG. 5 is an exemplary block diagram of a security module included in each data processing IC of a digital system, such as a PC, a set-top box, a mobile phone, a DVD reader, and the like. Security module 500 provides data encryption, decryption, etc., using a symmetric key. In one embodiment, this configuration is implemented in each data processing IC with minimal impact on the cost and the size of the ICs.

In a typical application, the embodiment of FIG. 5 is used to securely provide data to a recipient neighboring IC that uses the data, and to receive data secured (encrypted) by a neighboring data processing IC. This process may involve encrypting the data so it does not appear in plaintext and/or signing the data to certify to the recipient IC that the data originated from a specific originating IC.

For example, the security module may be integrated into a media processor chip (e.g., the media processor 308, among other data processing ICs of FIG. 3). Here, the security module may be used to sign and/or encrypt the information generated by the media processor. The security module may then securely send the information to a recipient IC (e.g., CPU 302 of FIG. 3) that uses the information. In this case, the recipient IC uses its own public/private key to decrypt the received information and further process the decrypted information. The recipient data processing IC, in turn, encrypts the processed data before transmits ting the data to its other neighboring IC for further processing (e.g., the Memory Controller 304 of FIG. 3).

The above keys (specifically the private key) are stored in a nonvolatile memory ("NVM") 510. The NVM 510 may comprise, for example, a one-time programmable ("OTP") memory or battery backed memory (BBMEM). In some embodiments an OTP memory may be preferred because the contents of the OTP memory need not pass outside of the chip. Examples of architectures and implementations of OTP memories are described in, for example, U.S. Pat. Nos. 6,525, 955, 6,700,176 and 6,704,236 and U.S. patent application Ser. No. 10/041,296, filed Jan. 8, 2002, the disclosure of each of which is hereby incorporated by reference herein.

In the case of an OTP, the OTP may be programmed by the master controller 506 via a programming interface in conjunction with an external programming signal VPP. The master controller ensures that the OTP 510 is completely clear by reading and writing a long term key cache location array prior to programming. If the array is clear, a single security bit is programmed first before programming any other bit elements.

After the OTP is programmed, the device's long term key (s) are verified by reading the device key cache locations to ensure they are correct. Once verified, the second security bit is programmed by the master controller 506 to complete the initialization process. The NVM will not mark the long term key(s) as valid unless both security bits have been programmed.

The OTP control logic will lock out the programming logic unless, both security bits are clear following a reset. This prevents a partially programmed bit array from being reprogrammed. These methods help to ensure that the device long term key(s), authorization and configuration data can be programmed once and only once. The security bits are read by hardware after the external reset is released and before the security module is released from reset. A random number generator 516 generates random numbers to be used for generating one or more of the symmetric keys.

In some embodiments the value from the random number generator 516 is never used directly. For example, it may be post processed using the SHA-1 block 504 by the master controller 506, before internal usage and before exposing the number external to the security module as a random value. The master controller may maintain a cache of post processed random bits (for key generation and for signing) in the data buffer 518. The random number generator 516 may be a "true" random source. For example, it may utilize free running oscillators to capture thermal noise as the source of randomness.

As shown in FIG. 5, the security module includes a master controller 506 and an external interface 512 to enable the asymmetric key operations that are performed when the secure link is initially established with, for example, a neighbor IC. Thus, the controller 506 includes circuitry to generate and verify the validity of its keys. In some embodiments the master controller 506 comprises a RISC processor with ROM code to execute the various commands necessary for the operation of the stateless module. The master controller block also may include the address decoder for each of the slave blocks on the internal bus. The RISC engine uses a protected portion of the data buffer for temporary stack and scratch data space. The protected data region is not allowed to ever overlap with any space that may be allocated to the external memory interface.

In some embodiments, the data is always maintained within a security boundary. First, by incorporating the security module into each of the data processing ICs, the information is encrypted before it leaves the hardware boundary of the ICs. Second, the security module established a secure channel with the recipient ICs through a symmetric key exchange. In this way, the information is securely sent to each of the recipient data processing ICs.

For example, the recipient data processing IC includes a security module described with respect to FIG. 5. In this case, the recipient IC may use other keys to securely send the information to a neighboring IC. In other embodiments, it may only be necessary to establish that the data originated from a specific IC. For example, the system may make other provisions to ensure that a data stream is not being replayed at a later time. In this case, it may be unnecessary to encrypt the information. All that may be needed here is an assurance that the information is being sent by a specific (and/or authorized) IC. In this case, adequate security may be provided by simply signing the data by the originating IC. This provides a solution that is cost effective for a variety of digital devices.

The module includes a cryptographic block 528 for performing cryptographic algorithms, such as, DH, DSA, 3DES, AES, etc. In one embodiment, the application code for cryptographic algorithms (e.g., DH, DSA, 3DES, AES) may be stored in a ROM 508. The embodiment shown in FIG. 5 secures an incoming data stream (DI) by signing it using, for example, the SHA-1 algorithm. Accordingly, a separate processing block 504 may be provided for this operation. The signed output of this processing block provides a data stream (DO) that is sent to the recipient IC via a data interface within the IC. In an embodiment that also encrypts the data stream, a dedicated processing block 928 implements, for example, a symmetric encryption algorithm.

In one embodiment, the security module includes several cryptographic processing blocks. For example, processing blocks may be incorporated to perform an HMAC-SHA-1 message authentication code algorithm. Processing blocks also may be provided for performing confidentiality symmetric algorithms such as 3DES and AES. Public key algorithms that may be supported include, for example, Diffie-Hellman, Digital Signature Algorithm ("DSA") and RSA. Discrete Logarithm Integrated Encryption Standard ("DLIES") algorithms also may be supported. Depending on the performance requirements of the system, these processing blocks may be implemented in hardware and/or using firmware stored in the ROM and executed by the master controller 506.

In one embodiment, the security module includes a public key acceleration engine ("PKE") (not shown). The PKE may provide acceleration for algorithms such as the Diffie-Hellman algorithm, the RSA algorithm and/or the digital signature standard ("DSA") algorithm. The Diffie-Hellman public key algorithm may be used, for example, for key agreement in a number of protocols, including IKE, SSL, and TLS. The RSA public key algorithm may be used, for example, for digital signature authentication and key exchange in IKE, SSL, and TLS. The DSA algorithm may be used, for example, to sign and verify data. It also is widely used in a number of other applications, such as Public Key Infrastructure ("PKI") products.

The PKE may be used to accelerate the algorithms required for key agreement during a key session setup. In some embodiments the security module requires that all "secret" key material for the PKE messages be loaded from a KEK cache for internal key operations. The PKE also may be used to encrypt, decrypt, sign and verify data streams using keys from a key cache.

The authentication core 504 may be used to provide the basic SHA-1 algorithm implementation. The result of a given operation may be a 160 bit digest. The initial value of the state registers for the SHA-1 algorithm can be programmed into a digest register as the starting point for the authentication.

In one embodiment, the security module includes a time stamp circuitry for "time stamping" each transaction with each of the neighboring data processing ICs. Furthermore, a transaction counter generates a transaction history of each data transaction for each of the neighboring ICs. The time stamped transaction history is then stored in NVM 510. Therefore, each data processing IC, via the security module maintains a shared state with each of its neighboring data processing ICs.

In one embodiment, the encryption core 528 is a triple DES minimal gate count implementation. It uses a single cycle per round implementation to minimize gate count. The input is double buffered such that it can be loaded while operating on the previously loaded value. The output is implemented in the same manner such that the master controller 506 can load the next and unload the previous values from the block while the current value is being processed.

The single round implementation implements both encryption and decryption of the CBC and ECB 3DES algorithm. The key is provided via a key register (write only) that is written by the master controller. The key values are transferred from the application key cache, KEK key caches or the result of the shared secret derivation prior to data operations. The 3DES block 528 protects the data operation such that the master controller cannot change the key during a block encryption or decryption.

Optionally, the module may include an assurance logic 520 to protect the security module from system security attacks. To this end, several system monitors may be coupled with the other components in the security module and/or the IC within which the stateless module resides.

In some embodiments, protection circuits trigger a reset of the stateless module when an attack is detected. This reset may wipe out all transient information in the stateless module. For example, all key cache locations may be cleared. An interrupt may be provided to the local host with information on which protection mechanism triggered the reset.

Figure 6:
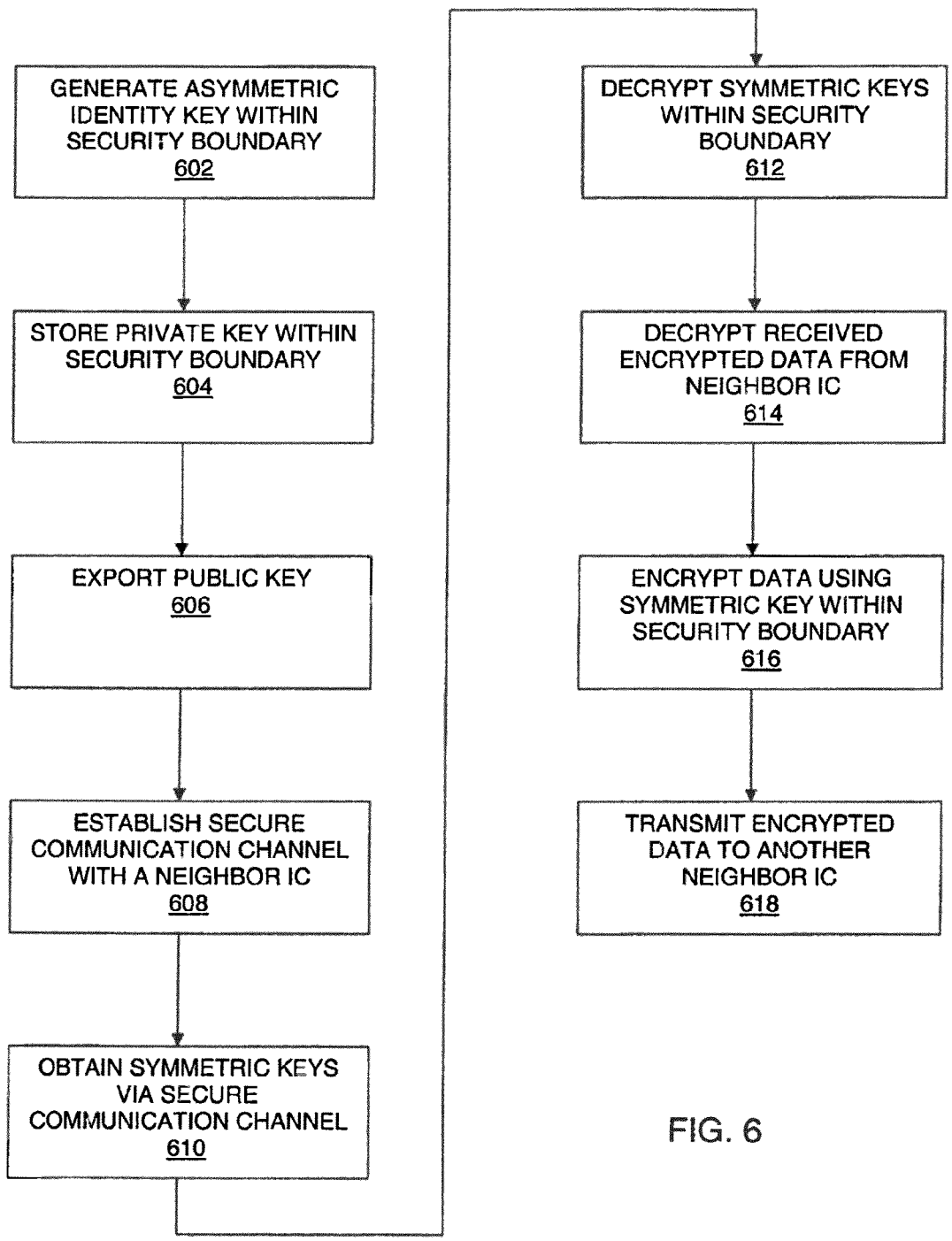
FIG. 6 is an exemplary process flow for a hardware security module, according to one embodiment of the present invention.

Referring now to FIG. 6, an example of operations that may be performed by one embodiment of a security module is discussed. As represented by blocks 602 to 610, security module generates a public-private key pair, stores the private (identity) key in a nonvolatile memory within the security boundary, exports the public key and establishes a secure communication channel with, for example, a neighboring data processing IC.

As represented by block 610 the neighbor IC may send its public key and/or its chip ID to the security module via the secure communication channel. For example, the neighbor IC may send its public key and chip ID that are used to encrypt and/or sign data that the security module receives from the neighbor IC. As represented by block 612, if the public key and/or chip ID from the neighbor IC are encrypted, the security module decrypts the received encrypted public key and/or chip ID within the security boundary associated with the security module. In one embodiment, the chip ID is injected into the security module during manufacture (e.g., during chip test). In one embodiment, the chip ID is encrypted before it is "burned" in the IC.

In one embodiment, when the IC including the security module is initialized for the first time after manufacture (e.g., during testing), circuitry in the module may use the random number generator to generate the public-private key pair discussed above. The module stores the private (identity) key in a nonvolatile memory or a one time programmable memory. A chip ID may also be generated during this time. The security module may then export the chip ID and the manufacturer publishes this chip ID along with a certificate to a public server, which can then be securely accessed.

As represented by block 614, the security module receives encrypted data to be decrypted from the neighbor IC and uses the symmetric keys within the security boundary to decrypt the data to further process the decrypted data. Once the data is processed, the security module encrypts the processed data using the symmetric keys within the security boundary, as shown by block 616. Then, as represented by block 618, the security module sends the encrypted data to a next neighbor IC.

Figure 7:
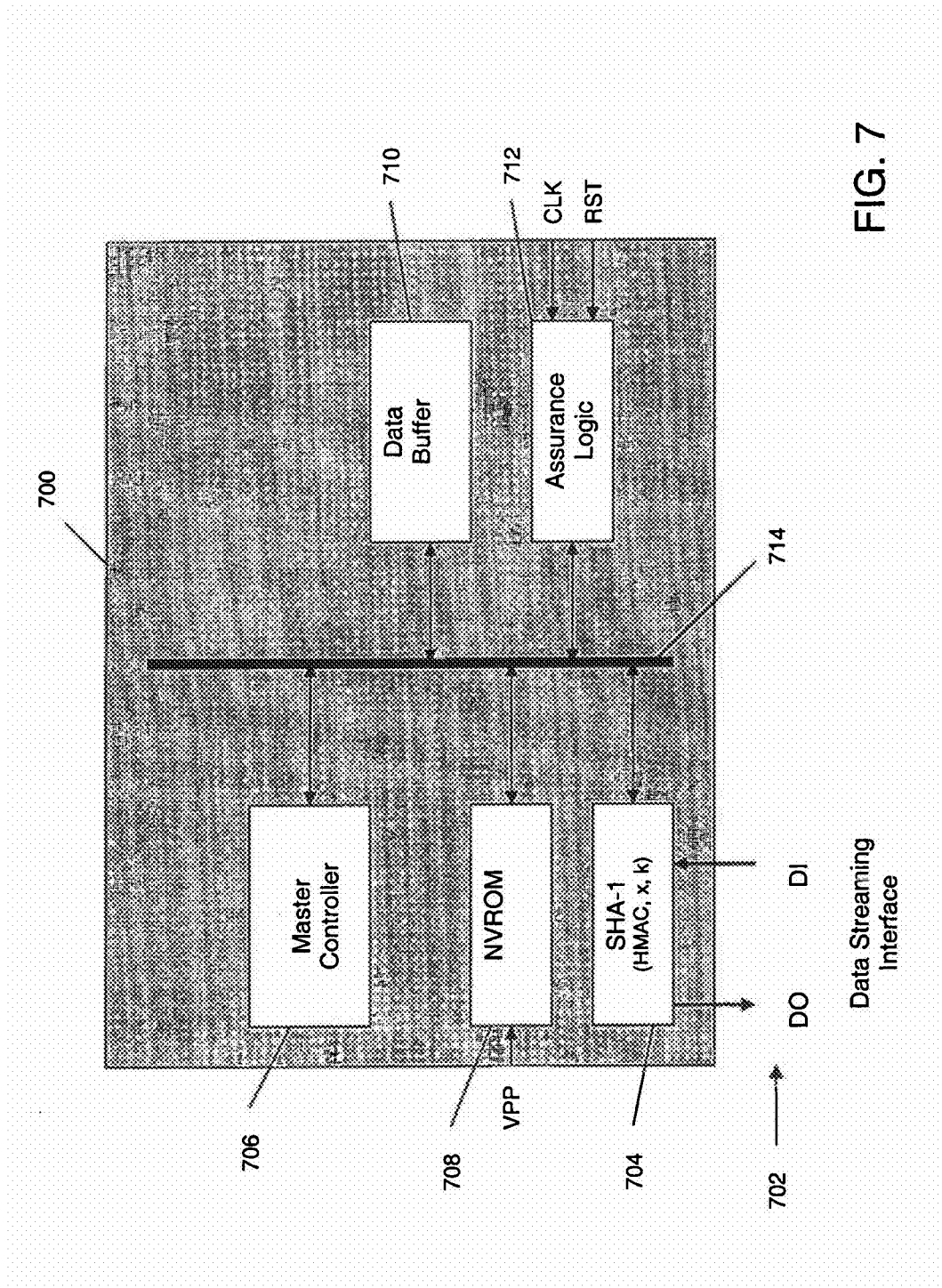
FIG. 7 is a simplified block diagram of a hardware security module, according to one embodiment of the present invention.

In some embodiments, the symmetric key and the chip ID may be injected into the stateless module during manufacture. In this case, the external interface 512, the RNG 516 and the asymmetric key processing circuitry may not be needed. Accordingly, as illustrated in FIG. 7, a security module 700 may simply include a relatively small master controller 706 for injecting the symmetric key and performing other basic operations, a nonvolatile memory 708, a data buffer memory 710, a cryptographic processor 704 for the symmetric key operations and optionally, assurance logic 712.

It will be recognized by those skilled in the art that various modifications may be made to the illustrated and other embodiments of the invention described above, without departing from the broad inventive scope thereof. It will be understood therefore that the invention is not limited to the particular embodiments or arrangements disclosed, but is rather intended to cover any changes, adaptations or modifications which are within the scope and spirit of the invention as defined by the appended claims.

What is claimed is:

1. A secure digital system comprising:
a plurality of data processing integrated circuits (ICs) exchanging data among each other, each respective data processing IC comprising:
an authentication module configured to authenticate a neighboring data processing IC;
a history module configured to store a historical information regarding data transactions with the neighboring data processing IC;
a cryptographic processor configured to encrypt data communicated to and decrypt data received from the neighboring data processing IC; and
an assurance module, in communication with the history module, configured to detect attempts to tamper with the respective data processing IC based on the historical information;
wherein the historical information comprises a transaction counter configured to generate a transaction history for each data transaction with the neighboring data processing IC.

2. The secure digital system of claim 1, wherein the assurance module is further configured to reset the respective data processing IC when an attempt to tamper with the respective data processing IC is detected.

3. The secure digital system of claim 2, wherein the assurance module is further configured to provide an interrupt when the attempt to tamper with the respective data processing IC is detected.

4. The secure digital system of claim 1, wherein the assurance module is further configured to remove all transient information in the respective data processing IC when an attempt to tamper with the respective data processing IC is detected.

5. The secure digital system of claim 1, wherein the assurance module is further configured to determine whether a replay attack is occurring using the historical information.

6. The secure digital system of claim 5, wherein the assurance module is further configured to determine whether the replay attack is occurring based on a timestamp.

7. The secure digital system of claim 1, wherein the historical information comprises a state shared with the neighboring data processing IC.

8. The secure digital system of claim 1, wherein the cryptographic processor includes:
a public key acceleration engine configured to accelerate a cryptographic algorithm.

9. The secure digital system of claim 1, wherein the authentication module is further configured to use a SHA-1 algorithm to authenticate the neighboring data processing IC.

10. The secure digital system of claim 1, wherein the assurance module comprises one or more system monitors coupled to a component of the respective data processing IC.

11. The secure digital system of claim 1, wherein the historical information is stored in battery back up memory.

12. A method for securely processing data in a data processing integrated circuit (IC) within a digital device including a plurality of data processing ICs comprising:
authenticating, by the data processing IC, a neighboring data processing IC;
storing, by the data processing IC, a historical information of data transactions with the neighboring data processing IC, wherein the historical information comprises a transaction counter configured to generate a transaction history for each data transaction with the neighboring data processing IC;
encrypting and decrypting, by the data processing IC, data communicated with the neighboring data processing IC; and
detecting, by the data processing IC, attempts to tamper with the data processing IC based on the historical information.

13. The method for securely processing data in a digital device of claim 12, further comprising triggering a reset when an attempt to tamper with the data processing IC is detected.

14. The method for securely processing data in a digital device of claim 13, wherein the triggering the reset further comprises providing an interrupt when the attempt to tamper with the data processing IC is detected.

15. The method for securely processing, data in a digital device of claim 13, wherein the triggering the reset further comprises erasing all transient information from the data processing IC.

16. The method for securely processing data in a digital device of claim 12, wherein the detecting further comprises determining whether a replay attack is occurring using the historical information.

17. The method for securely processing data in a digital device of claim 12, wherein the historical information comprises state shared with the neighboring data processing IC.

18. The method for securely processing data in a digital device of claim 12, further comprising storing the historical information in battery back up memory.

19. The method for securely processing data in a digital device of claim 12, further comprising accelerating the authenticating of the neighboring data processing IC.

* * * * *

UNITED STATES PATENT AND TRADEMARK OFFICE
CERTIFICATE OF CORRECTION

| | | |
|---|---|---|
| PATENT NO. | : 8,909,932 B2 | Page 1 of 1 |
| APPLICATION NO. | : 13/620375 | |
| DATED | : December 9, 2014 | |
| INVENTOR(S) | : Buer et al. | |

It is certified that error appears in the above-identified patent and that said Letters Patent is hereby corrected as shown below:

In the Claims

Column 11, line 1, please replace "processing, data" with --processing data--.

Signed and Sealed this
Eighth Day of September, 2015

Michelle K. Lee
*Director of the United States Patent and Trademark Office*